US011829622B2

(12) United States Patent
Klipper et al.

(10) Patent No.: US 11,829,622 B2
(45) Date of Patent: Nov. 28, 2023

(54) UNTYING COMPRESSION RELATED LINKS TO STALE REFERENCE CHUNKS

(71) Applicant: VAST DATA LTD., Tel Aviv (IL)

(72) Inventors: Lior Klipper, Tel Aviv (IL); Alon Berger, Tel Aviv (IL); Itay Khazon, Tel Aviv (IL); Yogev Vaknin, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 96 days.

(21) Appl. No.: 17/650,245

(22) Filed: Feb. 7, 2022

(65) Prior Publication Data

US 2023/0251787 A1  Aug. 10, 2023

(51) Int. Cl.
*G06F 3/06* (2006.01)
(52) U.S. Cl.
CPC ............ *G06F 3/064* (2013.01); *G06F 3/0608* (2013.01); *G06F 3/0673* (2013.01)

(58) Field of Classification Search
CPC ....... G06F 3/064; G06F 3/0608; G06F 3/0673
See application file for complete search history.

(56) References Cited

U.S. PATENT DOCUMENTS

2017/0123676 A1\* 5/2017 Singhai ................. G06F 3/0608

\* cited by examiner

*Primary Examiner* — Edward J Dudek, Jr.
(74) *Attorney, Agent, or Firm* — Reches Patents

(57) ABSTRACT

A method for selectively untying at least one of compression related links to a stale reference chunk, the method may include determining whether a compression effectiveness condition is fulfilled in relation to a set of referring chunks that are compressed using the stale reference chunk and are linked to the to the stale reference chunk by the compression related links; wherein the compression effectiveness condition is responsive to, at least, a number of the referring chunks of the set; and untying the at least one compression related links to the stale reference chunks when the compression effectiveness condition is not fulfilled.

19 Claims, 3 Drawing Sheets

Determining whether a compression effectiveness condition is fulfilled in relation to a set of referring chunks that are compressed using the stale reference chunk and are linked to the to the stale reference chunk by the compression related links. The compression effectiveness condition is responsive to, at least, a number of the referring chunks of the set. 510

Searching for the set of referring chunks using similarity hash function values of the referring chunks and of the stale reference chunk. 512

Untying the at least one compression related links to the stale reference chunks when the compression effectiveness condition is not fulfilled. 520

UNTYING COMPRESSION RELATED LINKS TO STALE REFERENCE CHUNKS

TECHNICAL FIELD

The present disclosure generally relates to the field of data storage, and more particularly to selectively untying at least one of compression related links to a stale reference chunk.

BACKGROUND

Storage systems may improve the utilization of their storage resources in various manners—such as compressing data chunks, deleting non-used data chunks, and the like. A reference chunk may be used to compress other chunks (referred to as referring chunks). A reference chunk cannot be deleted until there are no referring chunks that are linked to the reference chunk.

There is a growing need to provide an efficient method to manage the links between a reference chunk and referring chunks.

SUMMARY

There may be provided a storage system, a method and a non-transitory computer readable medium for selectively untying at least one of compression related links to a stale reference chunk.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 2 is an example of a method.

DETAILED DESCRIPTION

Figure 1:
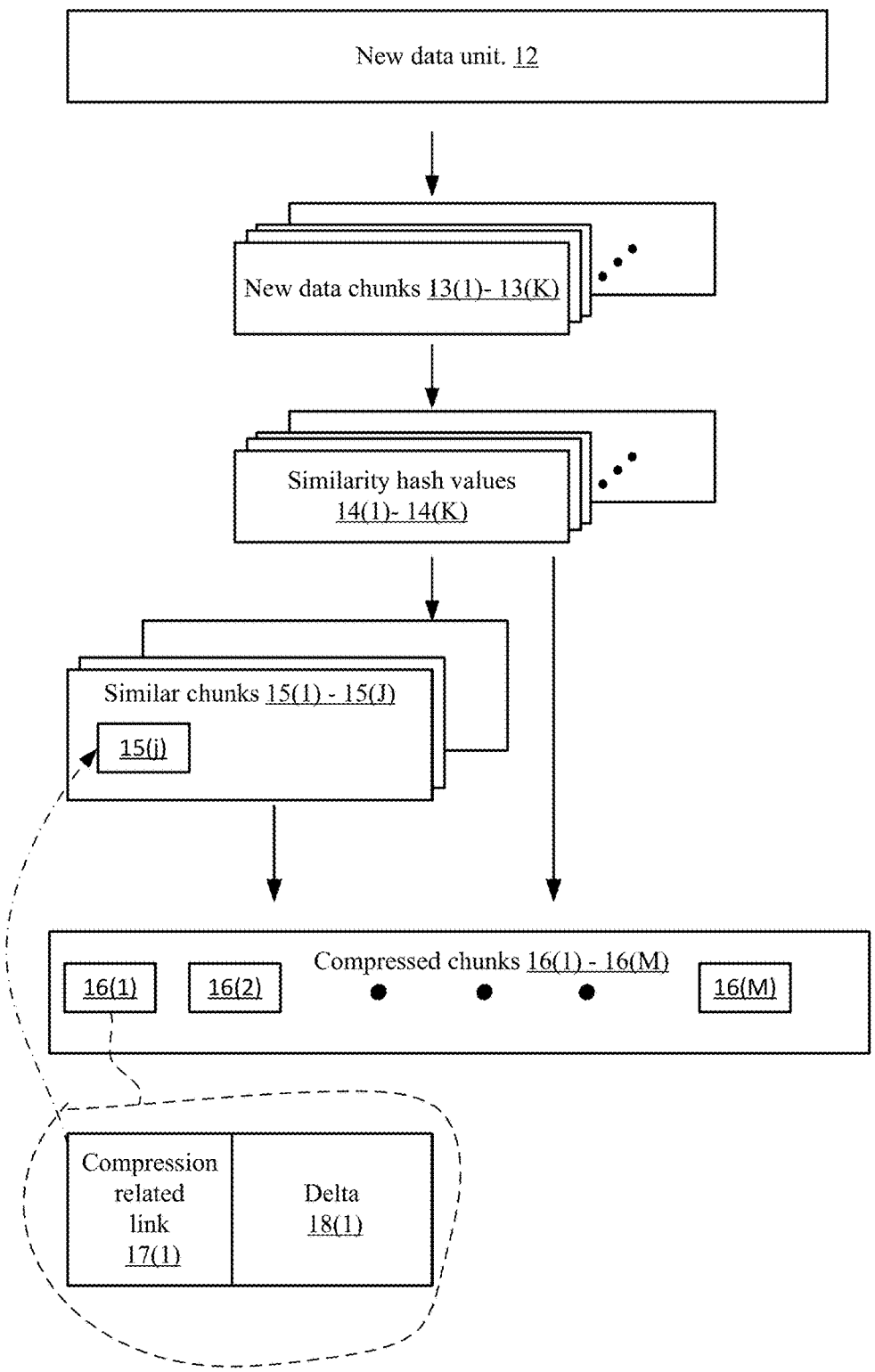
FIG. 1 is an example of data structures.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a controller. The controller can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

There are provided systems, method and non-transitory computer readable medium for selectively untying at least one of compression related links to a stale reference chunk.

The untying may be complicated—especially when the compression related links are stored separately from the reference chunk—and when there are multiple referring chunks.

It has been found that the accuracy of the determination of when to untie compression related links can be improved by taking into an account the number of referring chunks that are linked to a referring chunk.

The method may base decisions to untie a compression related link from a referring chunk to a reference chunk on a compression effectiveness condition that may indicate an effectiveness of a compression that uses a reference chunk. The compression effectiveness condition may be responsive to a compression ratio. The following text refers to a compression ratio.

The following storage system and methods detect data blocks that were compressed using similarity compression, where the compression ratio is no longer sufficient, due to a stat e block that serves as a reference block in the compression of other blocks. The stale block is a block that is no longer pointed by any logical entity (e.g., file, object, database table) that is stored in the system, but the stale block still cannot be deleted due to dependent blocks that rely on it for their compression. When such dependent blocks are detected, their similarity dependency from the reference block is untied and a new compression mechanism is determined for the dependent block, based on similarity findings.

Similarity hashing, such as Locality Sensitive Hashing (LSH), preserves item similarity, such that when applying the hash function on similar items, they will produce the same hash value with high probability. Similarity hashing can help identifying data blocks having slight changes. Known hash functions include Minhash, SimHash, and idhash.

The data in the storage system is chunked for the sake of detecting similarity connections among the stored chunks. The chunks may be of a fixed size or may vary within a determined size range. The terms block and chunk are used interchangeably.

Chunks metadata may include one or more tables that include for each chunk in the system: (i) a location where the chunk is stored (e.g., a pointer to a physical storage address); (ii) similarity reference count that indicates how many data chunks are similar to this chunk and uses the data of this chunk for their compression; (iii) delete mark—indicates whether the chunk is still alive, i.e., referred by logical entities (e.g., files, objects, database tables/indices, etc.) stored in the system or the chunk is a stale chunk that is not referred by logical stored entities.

A similarity hash data structure includes for each reference chunk or unique chunk (that has no similar chunks) one or more similarity hash values—used for finding similar chunks.

When a new data (see new data unit 12 of FIG. 1) is added to the system, the data is split into chunks (see new data chunks 13(1)-13(K) of FIG. 1) according to either a fixed size or according to its contents. For each new chunk of the new data, one or more similarity hash values are calculated (see similarity hash values 14(1)-14(K) of FIG. 1 that are calculated for the new data chunks 13(1)-13(K)), and a similar chunk that shares the one or more similarity hash is searched (see similar chunks 15(1)-15(J) of FIG. 1 that were found when searching for chunks associated with hash values 14(1)-14(K)), using the similarity hash data structure.

If a similar chunk is found, the new chunk is compressed with reference to the similar chunk, also referred to as a reference chunk (see for example reference chunk 15(j) and reference chunks (compressed) 16(1) and 16(2) that refer to 19(j)). FIG. 1 illustrates a plurality of compressed chunks 16(1)-16(M).

The compression may be based on lossless compression algorithms such as, but is not limited to, delta encoding, Lempel-Ziv, and the like. Such compression results in a small delta portion (see for example delta 18(1) of referring chunk 16(1)) that is not part of the similar (reference) chunk, that includes a residual data, which is data that is not shared between the two chunks. The delta portion further includes one or more pointers to identical data portions in the reference chunk that serves as a dictionary (the pointers are also referred to compression related links, such as 17(1). The delta portion or the residual data can be self-compressed as well, or may remain uncompressed, for example, if it is very small or other situation where compression is not efficient.

Adding the new chunk to the storage system includes: (i) storing only the delta portion in a storage device of the system; (ii) adding metadata for the new chunk to include: the location where the delta portion is stored, and a pointer to the reference chunk. The pointer to the reference chunk may be stored in the chunk metadata or may be stored with the delta portion; (iii) increasing the similarity reference count of the reference chunk, to indicate that the new chunk is using the reference chunk for its similarity compression.

When a reference chunk is to be deleted (stale chunk), because it is no longer pointed by a logical stored entity, its data cannot be deleted as long as it is referenced by one or more other chunks that are similar to the stale reference chunk.

Retaining the data of the stale reference chunk may lead to scenarios where a total size of a referring chunk is larger than the size of the uncompressed chunk. For example, suppose the reference chunk and a second chunk that is referring to the reference chunk—each has an original uncompressed size of 32 KB, and the total for both is 64 KB. Suppose the compressed reference chunk has a size of 25 KB, the second (referring) chunk has a compressed size (of the delta portion) of 12 KB, where the sum of both is 37 KB. When the reference chunk becomes stale, its data cannot be released since it is referred to by the second chunk. Therefore, it turns out that when the reference chunk becomes stale, the size of the storage occupied for the second chunk is 37 KB, which is larger than the original uncompressed size of 32 KB.

Therefore, it is required to untie similarity dependencies that involve stale reference chunks, where the size of dependent chunks, when considering the contribution of the stale reference chunk, exceeds a desirable compression ratio.

Since it is not feasible for the reference chunks have back-pointers to all their referring chunks, in terms of space consumed for the vast number of pointers that would be needed, then—when the reference chunk becomes stale, the link to the referring chunks is not available.

Therefore, a background process is executed for releasing links of stale reference chunks, asynchronously to the marking of the reference chunk as a chunk intended for deletion. The background process may be executed periodically, constantly, when a certain number of reference chunks has been deleted, when the average compression ratio of the storage exceeds a certain threshold, and the like.

The background process scans the chunks metadata for chunks that point to reference chunks that are marked as intended to be deleted.

For each chunk (referring chunk) that refers to another chunk (reference chunk) that is marked as intended to be deleted, the compression ratio of the referring chunk is calculated, when taking into account: the size of the delta portion of the referring chunk, the size of the compressed reference chunk and the number of referring chunks (as indicated by the reference count). The latter two parameters may be used for calculating the contribution of the size of the reference chunk to the size of the currently checked referring chunk, when taking into account that this size is shared among all the chunks referring to the reference chunk.

A first example: suppose the size of the referring chunk (i.e., the delta portion) being checked is 16 KB, the compressed size of the reference chunk is 24 KB, and there are 10 referring chunks. It can be estimated that on average, each of the 10 referring chunks carries out a tenth of the size of the reference chunk (e.g., 2.4 KB). Therefore, the checked referring chunk consumes 18.4 KB (16+2.4).

A second example: suppose the size of the referring chunk (i.e., the delta portion) being checked is again 16 KB, the compressed size of the reference chunk is again 24 KB, but there is only one referring chunk, i.e., the checked referring chunk is the only referring chunk and therefore need to carry out the entire size of the stale reference chunk. Meaning that the actual size consumed by the referring chunk is 40 KB (16+24).

A third example: suppose the size of the referring chunk (i.e., the delta portion) being checked is again 16 KB, the compressed size of the reference chunk is 24 KB, but there are two referring chunks. It can be determined that the actual size consumed by the referring chunk is 28 KB (16+24/2).

The compression ratio assumed for the checked referring chunk can be estimated. Assuming that the sizes of all uncompressed chunks is 32 KB, then according to the first example, the compression ratio is 18.4/32=0.575, i.e., almost 1:2 ratio, which can be still considered as a good compression ratio, in spite of the waste imposed by the retaining of the stale reference chunk.

According to the second example, the estimated compression ratio is 40/32=1.25. Meaning that the compressed size is higher than the uncompressed size, which is definitely not acceptable.

According to the third example, the estimated compression ratio is 28/32=0.875. Although the compressed size is lower than the uncompressed size, a ratio of 0.875 may be considered as a bad compression in some circumstances, but may be considered also as acceptable, depending on the applied rules.

The acceptable compression ratio may be determined according to various rules, e.g., the calculated compression ratio of the referring chunk should not exceed a compression ratio threshold, where the compression ratio threshold may be determined as any of: (i) a current average compression rate of all the stored data or of data of a client that wrote the referring extent, (ii) the average compression rate plus an acceptable deviation, (iii) a fixed compression ratio, e.g., 0.9, 0.6, etc.

It can be determined whether the estimated compression ratio of the referring chunk that refers to the stale reference chunk, exceeds the acceptable compression ratio.

In case it is determined that the estimated compression ratio of the referring chunk exceeds the acceptable compression ratio, a process is handled for untying the link between the referring chunk and the reference chunk.

The untying of the link starts with searching whether there is another chunk in the system that is similar to the referring chunk, whose link needs to be untied. If another similar chunk is found, this other chunk will serve as the new reference chunk. Then, the original uncompressed content of the referring chunk is reconstructed, based on the delta portion of the referring chunk plus the uncompressed data of the stale reference chunk. The original uncompressed content of the referring chunk is then compressed against the new reference chunk, resulting a new delta portion that includes a new residual data portion (that may or may not be different from the previous new residual data portion owned by the referring chunk) that is not shared with the new reference chunk and one or more pointers to identical data portions in the new reference chunk.

If no similar chunk is found, the current chunk is self-compressed without referring to any other chunks. If there are other chunks that are still referring to the stale reference chunk, then when the background process reaches these other chunks, then the current chunk may become the new reference chunk to these other chunks.

Upon completing the changing of the dependency of the referring chunk, the reference count of the reference chunk is decreased, to indicate that the handled referring chunk is no longer compressed with the aid of the stale reference chunk. When there are no more chunks referring to the stale reference chunk (e.g., when the reference count reaches zero), the reference chunk is deleted from the storage.

FIG. 2 illustrates method 500 for selectively untying at least one of compression related links to a stale reference chunk.

Method 500 may start by step 510 of determining whether a compression effectiveness condition is fulfilled in relation to a set of referring chunks that are compressed using the stale reference chunk and are linked to the stale reference chunk by the compression related links. The compression effectiveness condition is responsive to, at least, a number of the referring chunks of the set.

Step 510 may include searching (step 512) for the set of referring chunks using similarity hash function values of the referring chunks and of the stale reference chunk.

The search may be required, for example, when the stale reference chunk is stored separately from the compression related links—and there is a need to find the referring chunks that are linked to the stale reference chunk. The search may be further required when the stale reference chunk does not include back pointers for pointing to referring chunks, i.e., the compression related links point in one direction—from the referring chunks to the reference chunk.

Step 510 may be followed by step 520 of untying the at least one compression related links to the stale reference chunks when the compression effectiveness condition is not fulfilled.

Step 520 may also include performing at least one operation when the compression effectiveness condition is not fulfilled.

The at least one operation may include at least one of:
a. Compressing a referring chunk without using the stale reference chunk.
b. Checking whether there is any other referring chunk still linked to the stale reference chunk.
c. Allowing the deletion of the stale reference chunk when there is no referring chunk that refers to it.
d. Continue to untie one or more remaining compression related links.

The compression effectiveness condition may:
a. Be responsive to a size of a given referring chunk of the set, a size of the stale reference chunk, and the number of the referring chunks of the set. The size of the given referring chunk refers to the portion (delta) that is not shared with the stale reference chunk.
b. Be responsive to (i) the size of the given referring chunk of the set, and (ii) a ratio between the size of the stale reference chunk and the number of the referring chunks of the set.
c. Be responsive to a relationship between (a) a size of a non-compressed version of the given referring chunk and (b) a sum of (i) the size of the given referring chunk of the set, and (ii) the ratio between the size of the stale reference chunk and the number of the referring chunks of the set. The a size of the non-compressed version of the given referring chunk may refer to the original size without being compressed with reference to the stale reference chunk.

Step 510 may include comparing a compression ratio threshold to an actual compression ratio, the actual compression ratio equals a ratio between (a) the size of a non-compressed version of the given referring chunk and (b) the sum of (i) the size of the referring chunk of the set, and (ii) the ratio between the size of the stale reference chunk and the number of the referring chunks of the set.

The compression ratio threshold may be set based on compression ratios of chunks stores in a storage system and are associated with a client (or with one or more clients) that is also associated with the given referring chunk.

The compression ratio threshold may be set based on compression ratios of chunks stored in a storage system, or on compression ratios of chunks stored in a part of the storage system.

For example—the compression ratio threshold may be set based on an average compression ratio of chunks stores in a storage system and are associated with a client that is also associated with the given referring chunk.

Figure 3:
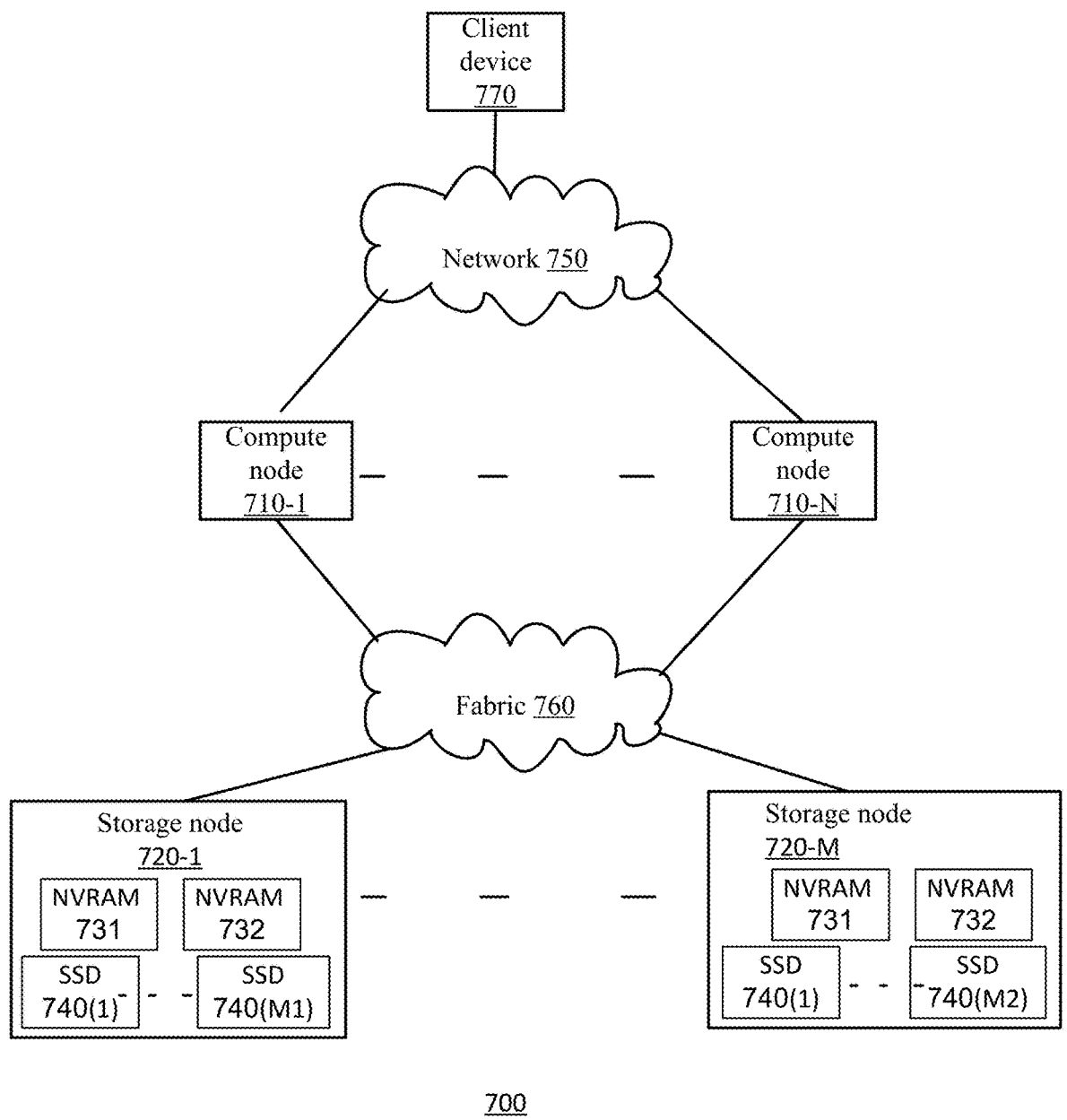
FIG. 3 is an example of a storage system.

FIG. 3 illustrates a storage system 700 that includes multiple (N) compute nodes 710-1 to 710-N and multiple (M) storage nodes 720-1 to 720-M. The compute nodes implement the logic of the storage system and are configured to execute method 500. The compute nodes communicate with the storage nodes via a network, such as fabric 760, and with one or more clients, such as client device 770, via network 750. The storage nodes include various storage devices, such as NVRAM (Non Volatile Random Access Memory) 731 and 732, SSDs (Solid State Drives) 740(1)-740(M1) of storage node 720-1, and SSDs 740(1)-740(M2) of storage node 720-2. The data chunks are stored in various storage devices of the storage nodes. The chunks metadata may reside in a faster storage device, such as NVRAM 731 and 732.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic DSs are merely illustrative and that alternative embodiments may merge logic DSs or circuit elements or impose an alternate decomposition of functionality upon various logic DSs or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for selectively untying at least one of compression related links to a stale reference chunk, the method comprising:

determining whether a compression effectiveness condition is fulfilled in relation to a set of referring chunks that are compressed using the stale reference chunk and are linked to the to the stale reference chunk by the compression related links; wherein the compression effectiveness condition is responsive to a number of the referring chunks of the set, a size of a given referring chunk of the set and a size of the stale reference chunk; and untying the at least one compression related links to the stale reference chunks when the compression effectiveness condition is not fulfilled.

2. The method according to claim 1 wherein the compression effectiveness condition is responsive to (i) the size of the given referring chunk of the set, and (ii) a ratio between the size of the stale reference chunk and the number of the referring chunks of the set.

3. The method according to claim 2 wherein the compression effectiveness condition is responsive to a relationship between (a) a size of a non-compressed version of the given referring chunk and (b) a sum of (i) the size of the given referring chunk of the set, and (ii) the ratio between the size of the stale reference chunk and the number of the referring chunks of the set.

4. The method according to claim 3 wherein the determining comprise comparing a compression ratio threshold to an actual compression ratio, the actual compression ratio equals a ratio between (a) the size of a non-compressed version of the given referring chunk and (b) the sum of (i) the size of the given referring chunk of the set, and (ii) the ratio between the size of the stale reference chunk and the number of the referring chunks of the set.

5. The method according to claim 4 wherein the compression ratio threshold is set based on compression ratios of chunks stores in a storage system and are associated with a client that is also associated with the given referring chunk.

6. The method according to claim 4 wherein the compression ratio threshold is set based on compression ratios of chunks stores in a storage system.

7. The method according to claim 4 wherein the compression ratio threshold is set based on an average compression ratio of chunks stores in a storage system and are associated with a client that is also associated with the given referring chunk.

8. The method according to claim 1 comprising searching for the set of referring chunks using similarity hash function values of the referring chunks and of the stale reference chunk.

9. The method according to claim 8 wherein the stale reference chunk is stored separately from the compression related links.

10. A non-transitory computer readable medium for selectively untying at least one of compression related links to a stale reference chunk, the non-transitory computer readable medium stores instructions for:

determining whether a compression effectiveness condition is fulfilled in relation to a set of referring chunks that are compressed using the stale reference chunk and are linked to the to the stale reference chunk by the compression related links; wherein the compression effectiveness condition is responsive to, at least, a number of the referring chunks of the set, a size of a given referring chunk of the set and a size of the stale reference chunk; and untying the at least one compression related links to the stale reference chunks when the compression effectiveness condition is not fulfilled.

11. The non-transitory computer readable medium according to claim 10 wherein the compression effectiveness condition is responsive to (i) the size of the given referring chunk of the set, and (ii) a ratio between the size of the stale reference chunk and the number of the referring chunks of the set.

12. The non-transitory computer readable medium according to claim 11 wherein the compression effectiveness condition is responsive to a relationship between (a) a size of a non-compressed version of the given referring chunk and (b) a sum of (i) the size of the given referring chunk of the set, and (ii) the ratio between the size of the stale reference chunk and the number of the referring chunks of the set.

13. The non-transitory computer readable medium according to claim 12 wherein the determining comprise comparing a compression ratio threshold to an actual compression ratio, the actual compression ratio equals a ratio between (a) the size of a non-compressed version of the given referring chunk and (b) the sum of (i) the size of the given referring chunk of the set, and (ii) the ratio between the size of the stale reference chunk and the number of the referring chunks of the set.

14. The non-transitory computer readable medium according to claim 13 wherein the compression ratio threshold is set based on compression ratios of chunks stores in a storage system and are associated with a client that is also associated with the given referring chunk.

15. The non-transitory computer readable medium according to claim 13 wherein the compression ratio threshold is set based on compression ratios of chunks stores in a storage system.

16. The non-transitory computer readable medium according to claim 13 wherein the compression ratio threshold is set based on an average compression ratio of chunks stores in a storage system and are associated with a client that is also associated with the given referring chunk.

17. The non-transitory computer readable medium according to claim 10 that stores instructions for searching for the set of referring chunks using similarity hash function values of the referring chunks and of the stale reference chunk.

18. The non-transitory computer readable medium according to claim 17 wherein the slate reference chunk is stored separately from the compression related links.

19. A storage system that comprises a controller that is configured to:

determine whether a compression effectiveness condition is fulfilled in relation to a set of referring chunks that are compressed using a stale reference chunk and are linked to the to the stale reference chunk by compression related links; wherein the compression effectiveness condition is responsive to a number of the referring chunks of the set, a size of a given referring chunk of the set and a size of the stale reference chunk; and untie the at least one compression related links to the stale reference chunks when the compression effectiveness condition is not fulfilled.

* * * * *